(12) United States Patent
He et al.

(10) Patent No.: US 8,052,410 B2
(45) Date of Patent: Nov. 8, 2011

(54) PLASTIC INJECTION MOLD

(75) Inventors: Peng He, Taipei (TW); Xiaoping Wu, Taipei (TW); Shih-Hsiung Ho, Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 72 days.

(21) Appl. No.: 12/684,898

(22) Filed: Jan. 9, 2010

(65) Prior Publication Data

US 2011/0171341 A1    Jul. 14, 2011

(51) Int. Cl.
   *B29C 45/00* (2006.01)

(52) U.S. Cl. ............... 425/190; 425/542; 425/573

(58) Field of Classification Search ............ 425/542, 425/190, 573
See application file for complete search history.

(56) References Cited

U.S. PATENT DOCUMENTS

| | | | | |
|---|---|---|---|---|
| 2,799,435 A | * | 7/1957 | Abplanalp | 264/328.8 |
| 4,726,925 A | * | 2/1988 | Binder | 425/573 |
| 2002/0167115 A1 | * | 11/2002 | Tanaka | 425/577 |

FOREIGN PATENT DOCUMENTS

JP    60-244516    * 12/1985

OTHER PUBLICATIONS

Donald v. Rosato and Dominick v. Rosato, Injection Molding Handbook, 1995, Chapman & Hill, 2nd Edition, pp. 257-260.*

* cited by examiner

*Primary Examiner* — Timothy Heitbrink

(57) ABSTRACT

A plastic injection mold for molding a plastic article includes an upper insert and a lower insert. The upper insert and the lower insert match with each other to define an annular mold cavity in between. An annular gate communicates with the mold cavity to allow molten plastic material to flow into the mold cavity to mold the article. An annular runner is connected with the annular gate for injecting molten plastic material to the annular gate. Molten plastic material will evenly flow into the mold cavity of the plastic injection mold through the annular gate to mold the plastic article, which prevents the plastic article from being disfigured, decreasing the number of defective products and improving the product quality.

4 Claims, 3 Drawing Sheets

PLASTIC INJECTION MOLD

BACKGROUND OF THE INVENTION

1. Field of the Invention

The present invention relates to a mold, and more particularly to a plastic injection mold for molding a plastic article.

2. The Related Art

Nowadays, plastic articles are mostly manufactured by injection molding method. In general, a plastic injection mold comprises an upper insert, a lower insert and a runner system. A mold cavity is defined between the upper insert and the lower insert when they are combined together. The runner system is provided for injecting molten plastic material from a nozzle of an injection molding machine to the mold cavity. The runner system generally includes a sprue, a runner and a gate. The sprue connects the nozzle and the runner. The gate is an entrance of the mold cavity. The molten plastic material is injected into the runner from the sprue, and then flows into the mold cavity through the gate to form plastic articles. As known by the skilled in the field, the gate directly influences appearance, deformation, molding constringency rate and strength of molded articles. The gate style is chosen in accordance with the molded article. However, the conventional gate design is apt to make the molded article disfigure, causing possible material shortage, weld marks, shrinkage, gate-white-flecks, warpage, brittleness, degradation, etc. when the molded article is very small and thin.

SUMMARY OF THE INVENTION

An object of the present invention is to provide a plastic injection mold for molding a plastic article. The plastic injection mold includes an upper insert and a lower insert. The upper insert and the lower insert match with each other to form an annular mold cavity in between. An annular gate communicates with the mold cavity to allow molten plastic material to flow into the mold cavity to mold the article. An annular runner is connected with the annular gate for injecting the molten plastic material to the annular gate.

As described above, the molten plastic material will evenly flow into the mold cavity of the plastic injection mold through the annular gate to mold the plastic article, which prevents the plastic article from being disfigured through material shortage, weld marks, shrinkage and so on, decreasing the number of defective products and improving the product quality. So the plastic injection mold is excellent and will be in general use.

BRIEF DESCRIPTION OF THE DRAWINGS

The present invention will be apparent to those skilled in the art by reading the following description of an embodiment thereof, with reference to the attached drawings, in which.

DETAILED DESCRIPTION OF THE EMBODIMENTS

Figure 1:
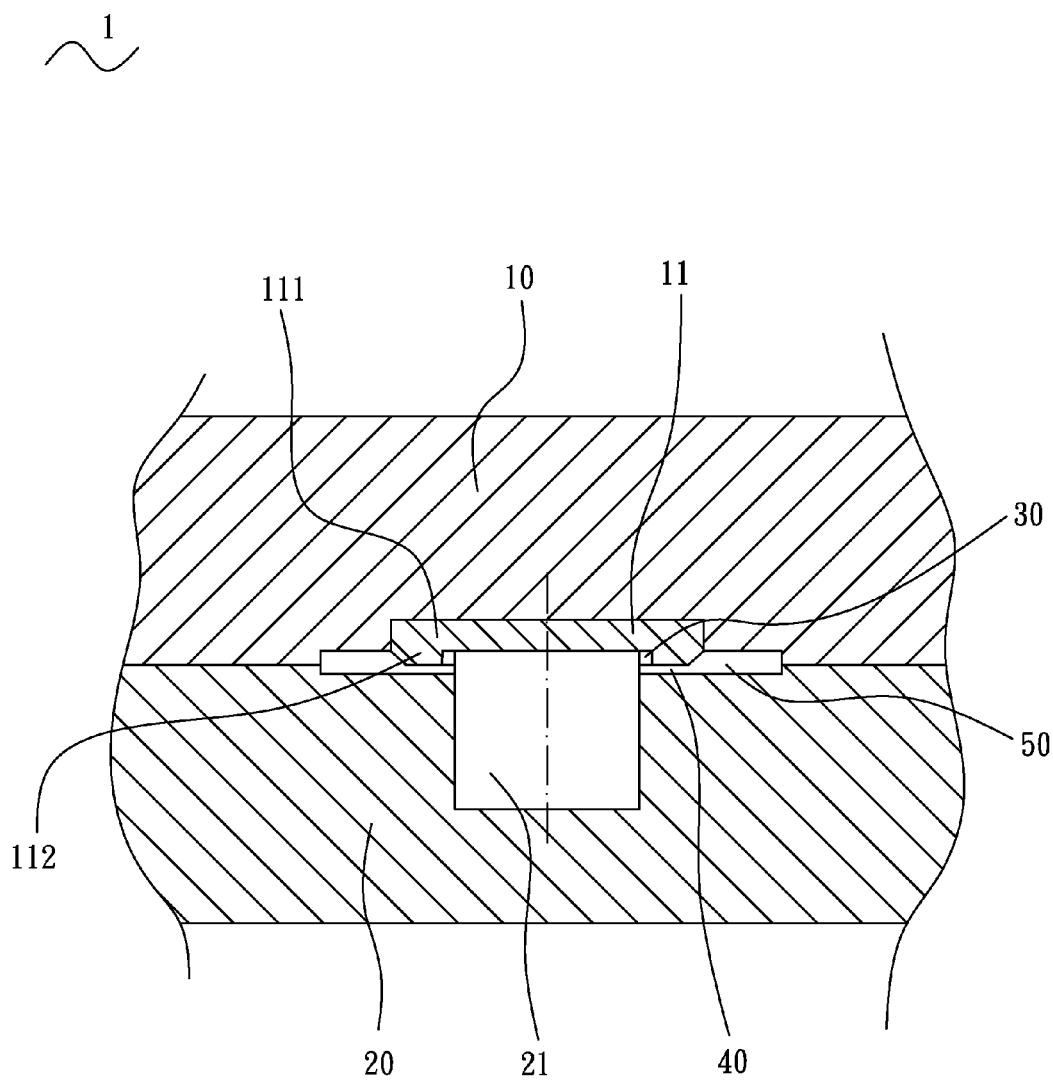
FIG. 1 is a schematic cross sectional view of a plastic injection mold in a first embodiment according to the present invention.
Figure 2:
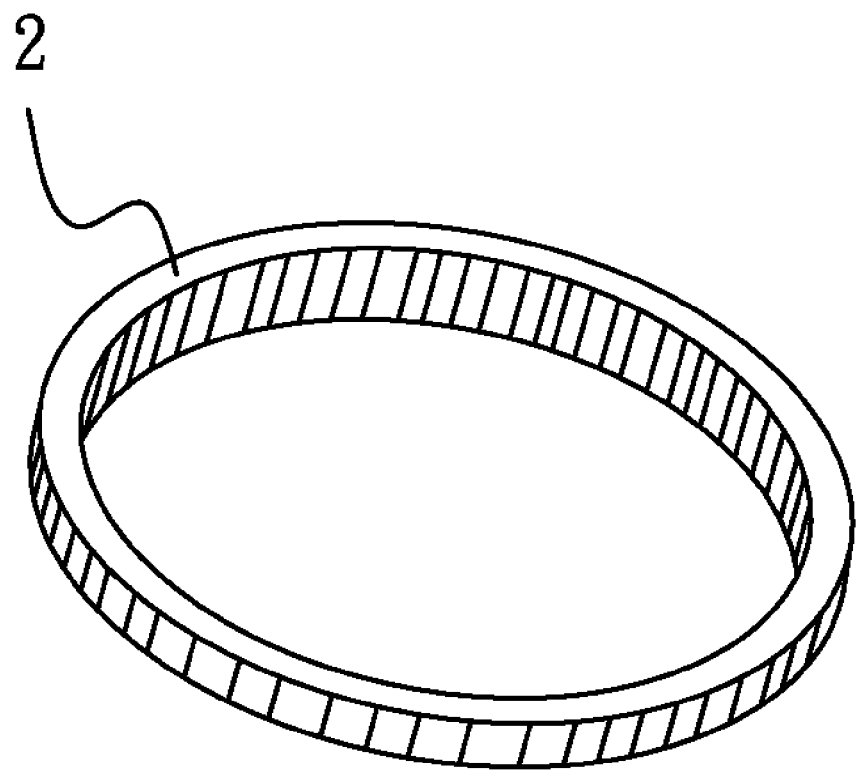
FIG. 2 a perspective view of a plastic article molded by the plastic injection mold shown in FIG. 1.

Please refer to FIG. 1, a plastic injection mold 1 of a first embodiment according to the present invention is shown. The plastic injection mold 1 includes a substantial rectangular upper insert 10 and a lower insert 20. A first mold core 11 is inserted in the upper insert 10. The lower insert 20 has a second mold core 21 disposed therein corresponding to the first mold core 11 of the upper insert 10 and projecting beyond a joint face of the lower insert 20. The first mold core 11 has a base 111 and an annular molding portion 112 protruded downwards from a periphery of a bottom of the base 111. A top of the second mold core 21 is matched with the bottom of the base 111, and an annular mold cavity 30 is formed between an inside of the molding portion 112 and an outside of an upper portion of the second mold core 21 when the upper insert 10 and the lower insert 20 are matched with each other. An annular gate 40 is formed under the molding portion 112 of the first mold core 11, with an inner side connected with a lower portion of an outer side of the mold cavity 30 and an outer side connected with an annular runner 50. The gate 40 is narrower than the mold cavity 30. The annular runner 50 connects with a sprue (not shown) which is arranged in the upper insert 10. In molding, molten plastic material which is supplied by an injection molding machine (not shown) is injected into the runner 50 from the sprue, and then flows into the mold cavity 30 through the gate 40 to form a plastic article 2 shown in FIG. 2. After molding, the plastic injection mold 1 is opened and the article 2 is taken out from the mold cavity 30 and separated with the redundant plastics by cut technology. It should be noted that, on the premise that the mold cavity can be filled up with the molten plastic material by the injecting pressure of the injection molding machine, the width of the gate is defined as narrow as possible.

Figure 3:
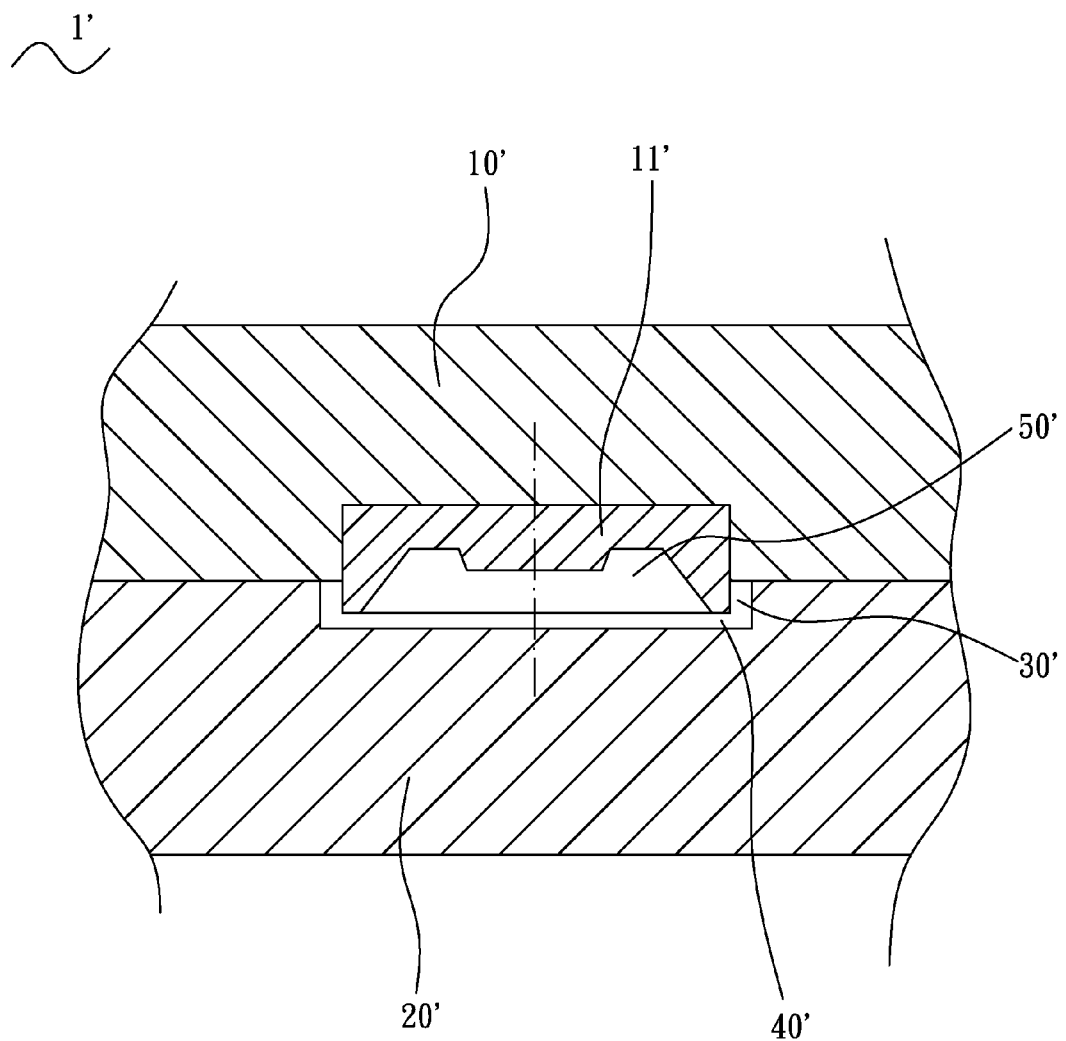
FIG. 3 is a schematic cross sectional view of a plastic injection mold in a second embodiment according to the present invention.

With reference to FIG. 3, a plastic injection mold 1' in accordance with a second embodiment of the present invention is illustrated. The injection mold 1' has an upper insert 10' and a lower insert 20'. The upper insert 10' has a first mold core 11' inserted therein, with a lower end protruded into the lower insert 20'. The upper insert 10' and the lower insert 20' are matched with each other to form an annular mold cavity 30' located at an outer side of the lower end of the first mold core 11', an annular gate 40' under an outer side of a bottom of the first mold core 11' and connecting with a lower portion of an inner side of the mold cavity 30', and a substantial annular runner 50' connected with an inner side of the annular gate 40' (herein, it is defined that the annular runner also includes a round runner). In molding, the molten plastic material is injected into the mold cavity 30' from the annular gate 40' to form the plastic article 2.

As described above, the molten plastic material will evenly flow into the mold cavities 30, 30' of the plastic injection molds 1, 1' from the gates 40, 40' to mold the plastic article 2, which prevents the plastic article 2 from disfigurements, such as material shortage, weld marks, shrinkage and so on, decreasing the number of defective products and improving the product quality. So the plastic injection molds 1, 1' are excellent and will be in general use.

The foregoing description of the present invention has been presented for the purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A plastic injection mold for molding a plastic article, comprising:

an upper insert; and a lower insert matching with the upper insert to define an annular mold cavity in between, an annular gate communicating with the mold cavity for molten plastic material to flow into the mold cavity to mold the article, and an annular runner connecting with the annular gate for injecting the molten plastic material to the annular gate;

wherein the upper insert has a first mold core inserted therein with a lower end protruded into the lower insert, the upper insert and the lower insert are matched with each other to form the annular mold cavity located at an outer side of the lower end of the first mold core, the annular gate under an outer side of a bottom of the first mold core and connecting with a lower portion of an inner side of the mold cavity, and the annular runner connected with an inner side of the annular gate.

2. The plastic injection mold as claimed in claim 1, wherein the annular gate is located at an outer side of the mold cavity and narrower than the mold cavity.

3. The plastic injection mold as claimed in claim 1, wherein the annular gate is connected with an inner side of the mold cavity and narrower than the mold cavity.

4. A plastic injection mold for molding a plastic article, comprising:

an upper insert; and a lower insert matching with the upper insert to define an annular mold cavity in between, an annular gate communicating with the mold cavity for molten plastic material to flow into the mold cavity to mold the article, and an annular runner connecting with the annular gate for injecting the molten plastic material to the annular gate;

wherein the upper insert has a first mold core inserted therein, the lower insert has a second mold core disposed therein corresponding to the first mold core of the upper insert and projecting beyond a joint face of the lower insert, the first mold core has a base and an annular molding portion protruded downwards from a periphery of a bottom of the base, a top of the second mold core is matched with the bottom of the base, and the annular mold cavity is formed between an inside of the molding portion and an outside of an upper portion of the second mold core when the upper insert and the lower insert are matched with each other, the annular gate is formed under the molding portion of the first mold core, with an inner side connected with a lower portion of an outer side of the mold cavity and an outer side connected with the annular runner.

* * * * *